(12) United States Patent
Velusamy et al.

(10) Patent No.: US 8,219,636 B2
(45) Date of Patent: Jul. 10, 2012

(54) NETWORKED MEDIA RECORDING

(75) Inventors: Umashankar Velusamy, Tampa, FL (US); George Hughes, Wesley Chapel, FL (US); Chris Helbling, Norwalk, CT (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 654 days.

(21) Appl. No.: 11/612,068

(22) Filed: Dec. 18, 2006

(65) Prior Publication Data
US 2008/0147826 A1    Jun. 19, 2008

(51) Int. Cl.
*G06F 15/16* (2006.01)
*G06F 15/167* (2006.01)
*G06F 3/00* (2006.01)

(52) U.S. Cl. ........ 709/217; 709/216; 709/219; 709/231; 725/38; 725/39

(58) Field of Classification Search ............ 709/217
See application file for complete search history.

(56) References Cited

U.S. PATENT DOCUMENTS

| 5,930,473 | A * | 7/1999 | Teng et al. ............. 709/204 |
| 7,639,943 | B1 * | 12/2009 | Kalajan ............. 396/429 |
| 2001/0052019 | A1 * | 12/2001 | Walters et al. ........ 709/231 |
| 2004/0111747 | A1 * | 6/2004 | Omoigui ............. 725/58 |
| 2004/0177151 | A1 * | 9/2004 | Kryeziu ............. 709/233 |
| 2005/0193421 | A1 * | 9/2005 | Cragun ............. 725/80 |
| 2006/0082730 | A1 * | 4/2006 | Franks ............. 352/95 |
| 2008/0134260 | A1 * | 6/2008 | Glassman et al. ........ 725/104 |

* cited by examiner

*Primary Examiner* — Jeffrey Pwu
*Assistant Examiner* — Jasmine Myers (57) ABSTRACT

A receiving module selectively receives a stream of digital data from a recording device via a network. A data store selectively stores the digital data. A streaming module that selectively streams the stored digital data to a network device via the network.

22 Claims, 4 Drawing Sheets

NETWORKED MEDIA RECORDING

BACKGROUND INFORMATION

Digital media recorders such as camcorders, cameras, camera phones, digital audio recorders, etc. allow users to record a variety of different kinds of data, such as video, audio, and still images. Today's digital media recorders are often portable and may be used in a variety of settings. However, a digital media recorder generally requires transferring digital content from a storage medium included in the digital media recorder to some other storage medium such as a computer disk drive, digital tape, etc. once the capacity of a storage medium included in the digital media recorder has been reached. Such transfers of digital content generally require establishing a connection between the digital media recorder and the other storage medium after digital content has been recorded. If the other storage medium is unavailable, then additional digital content generally cannot be recorded. Further, obtaining the connection to the other storage medium may be inconvenient, e.g., requiring a wired connection between the digital media recorder and the other storage medium, a wired or wireless connection between the digital media recorder and a local network to which the other storage medium is connected, etc. Thus, storing digital content recorded by a digital media recorder generally requires that the digital media recorder be in a particular and limited physical location. Moreover, if the digital media recorder or its storage medium is lost, damaged, destroyed, etc. before digital content can be transferred to another medium, the digital content will be lost.

DETAILED DESCRIPTION

Figure 1A:
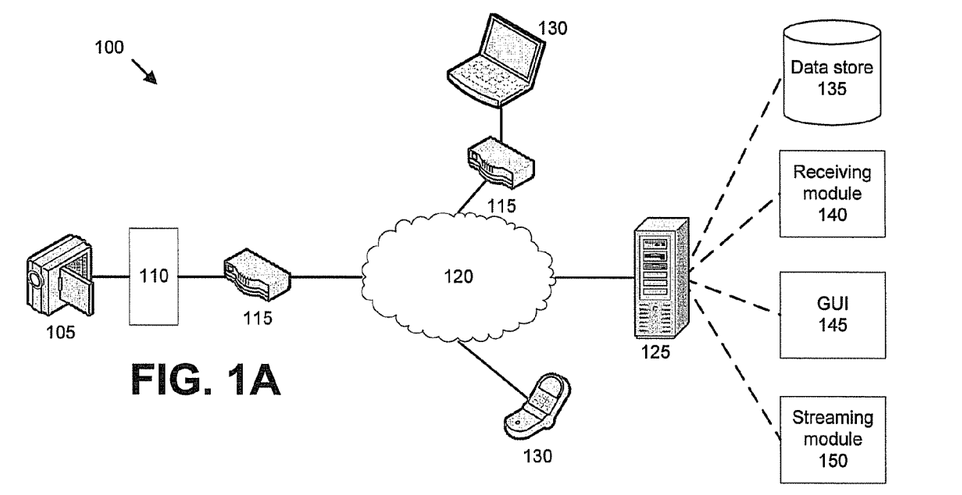
FIG. 1A illustrates an exemplary system for storing and retrieving recorded digital content over a network.

FIG. 1A illustrates an exemplary system 100 for storing and retrieving recorded digital content over a network.

A recording device 105 may include or may be attached to a network interface 110. The primary purpose of network interface 110 is to provide communications, including the transmission of digital data representing video, images, audio, etc., between recording device 105 and a router 115, which in turn allows recording device 105 to communicate through a packet-switched network 120. Digital content sent from recording device 105 may be stored in a media storage server 125, which includes a data store 135, a receiving module 140, a graphical user interface (GUI) 145, and a streaming module 150. Further, interface 110 may allow recording device 105 to receive data, including digital content, via network 120. One or more computers 130 may communicate with recording device 105 and/or media storage server 125 through packet-switched network 120.

Recording device 105 may be a digital media recorder such as a camcorder, digital video camera, digital still image camera, camera phone, personal digital assistant (PDA) digital audio recorder, or other computing device including a laptop or desktop computer equipped with a camera, etc. In general, recording device 105 may be any device that captures digital representations of phenomena including but not limited to images and sounds.

Network interface 110 is illustrated in FIG. 1 as being attached to recording device 105, although interface 110 may be included in recording device 105. Interface 110 generally includes a processor that is capable of executing, and a memory that is capable of storing, program instructions. Interface 110 is configured to send and receive communications with router 115, e.g., via a wireless connection according to any one of a number of known standards for providing a high-speed, high bandwidth wireless connection, such as Evolution-Data Optimized (EVDO), Enhanced Data rates for GSM (Global System for Mobile Communications) Evolution/General Packet Radio Services (EDGE/GPRS), code division multiple access (CDMA), CDMA including EVDO, etc. Interface 110 may include a cellular telephone or the like. Interface 110 may also communicate with router 115 through a wired connection such as an Ethernet connection that may be accomplished through a variety of known mechanisms, such as a Cat5 cable, IEEE 802.11, Bluetooth, etc. To accommodate wireless communications, interface 110 may include a radio frequency (RF) transceiver as is known for such communications. The specific manner or manners in which interface 110 communicates with router 115 and network 120 is not critical so long as the speed and bandwidth of the communication is sufficient to transfer digital data captured by recording device 105.

As mentioned above, interface 110 may be included within recording device 105. However, in embodiments in which interface 110 is connected to but not included within recording device 105, interface 110 may be connected to recording device 105 through any one of a number of known connections, e.g. a universal serial bus (USB), and IEEE 1394 High Speed Serial Bus, also known as FireWire, etc. Whether included within recording device 105 or not, interface 110 generally includes a data buffer for storing digital data received from recording device 105 prior to transmitting such data to router 115.

Router 115 may be any one of a number of known routers for routing digital packets and for connecting network devices, e.g., interface 110, server 125, network device 130, etc., to each other and/or to packet switched network 120. However, router 115 may be unnecessary in some cases, e.g., where recording device 105 or network device 130 is capable of directly connecting to the network, as is the case, for example, with a cellular telephone or the like.

Packet switched network 120 may be an Internet protocol (IP) network or the like such as is known for transporting digital data packets. For example, network 125 uses protocols such as user datagram protocol (NDP), transmission control protocol (TCP), hypertext transfer protocol (HTTP), etc. Further, network 120 may include a variety of networks such as a wide area network (WAN), e.g., the Internet, a local area network (LAN), etc.

Media storage server 125 is a combination of hardware and software, including one or more computing devices, and is connected to network 120. Further, media storage server 125 is generally configured to send and receive communications over packet switched network 120 according to protocols such as those mentioned above.

Media storage server 125 includes data store 135, which is a database system, file server system, or the like configured to store, digital data streamed from recording device 105, e.g., as files, objects in database tables, etc. It is to be understood that data store 135 generally includes a redundant set of database servers and/or file servers with sufficient computer readable storage to accommodate digital data streamed from recording devices 105. Media storage server 125 provides a large amount of storage for content from recording device 105, and for practical purposes may be thought of as providing a virtually unlimited amount of storage for recording device 105.

Receiving module 140 is generally a set of computer-readable instructions that includes instructions to receive a stream of digital data from recording device 105 via network 120, and to provide the digital data to data store 135 for storage. GUI 145, which may be rendered by a web server or the like included in media storage server 125, provides a mechanism for user inputs from network device 130 to request digital data stored in data store 135. Such digital data may be retrieved from data store 135 for provision to network device 130 by streaming module 150, which is generally a set of computer-readable instructions that includes instructions for sending a stream of digital data to network device 130.

Network device 130 may be any one of a number of known computing devices, such as a desktop computer, a laptop computer, a handheld computer, etc. Network device 130 may also be a communication device such as a cellular telephone or the like. Network device 130 is generally used to access digital data that has been streamed from recording device 105 and stored in the media storage server 125. However, although not illustrated in the drawing figures, network device 130 may include data store 135, receiving module 140, GUI 145, and/or streaming module 150. Accordingly, network device 130 may operate in a manner similar to the description herein of the operation of media storage server 125. Network device 130 may connect to network 120 through any one of a number of protocols, such as those mentioned above with respect to interface 110. Accordingly, the connection of network device 130 to network 120 may be either wired or wireless.

In some cases, where recording device 105 and media storage server 125 are in close proximity, e.g., in the same home, office, school, etc., router 115 and media storage server 125 may communicate directly, thus obviating the need for network 120. Similarly, router 115 and network device 130 may communicate directly. In such embodiments, router 115 effectively fulfills the functions of network 120.

Computing devices such as recording device 105, interface 110, server 125, and network device 130, etc. may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system.

Figure 1B:
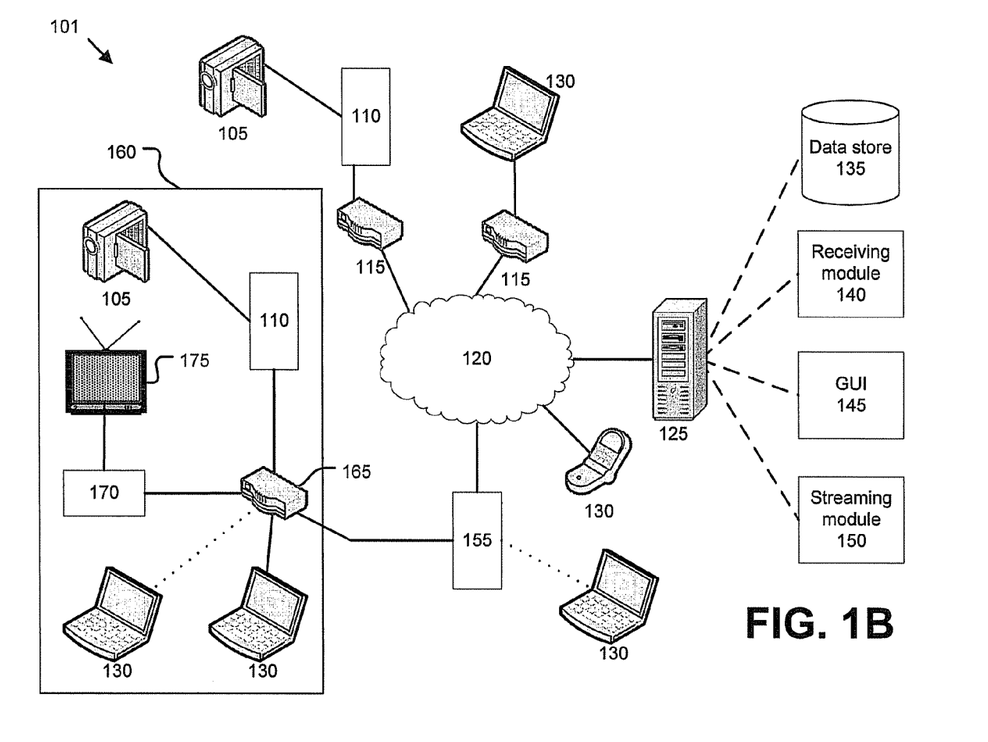
FIG. 1B illustrates another exemplary system for storing and retrieving recorded digital content over a network.

FIG. 1B illustrates an exemplary system 101 for storing and retrieving recorded digital content over a network. It may be seen that FIG. 1B illustrates certain elements in common with FIG. 1A. However, system 101 further includes access to network 120 provided by a service provider 155. Accordingly, network device 130 may connect, e.g., through a wired or wireless connection, to service provider 155 which in turn provides access to network 120. Service provider 155 is known for providing access to a packet switched network such as the Internet.

In addition, network device 130 may be included in a customer premises 160, and may connect to service provider 155 through a broadband home router (BHR) 165 or the like. Accordingly, network device 130 may utilize a wired or wireless connection to BHR 165. Customer premises 160 may also include a recording device 105 and a network interface 110, interface 110 being connected to be HR 165.

Further, customer premises 160 may include a content processing device 170, such as a set-top box (STB) or the like. Content processing device 170 is generally connected to a media distribution network such as a video distribution network (not shown in FIG. 1B), e.g., a network that provides a video signal through coaxial cable, fiber-optic cable, etc., and generally provides for the access of media through a media player 175. For example, media provided through content processing device 160 may include video, and media player 175 may be a television set, video monitor, or the like. Content processing device 160 includes a processor and a memory, and generally other computer readable media providing storage, and may be provided with a real time operating system (RTOS) such as is known. Content processing device 170 generally also includes, e.g., stored in a read only memory (ROM), a unique or substantially unique identifier that identifies the content processing device 170. It is to be understood that content processing device 170 may be a computing device such as one of those enumerated below, so long as the computing device is capable of receiving media content from a media distribution network, and is capable of storing and executing computer-executable instructions. Like network device 130, content processing device 170 may be connected to BHR 165 through a wired or wireless connection using one or more of the protocols mentioned above.

Computing devices such as those mentioned above generally each include instructions executable by one or more computing devices such as those listed above, and execution of the processes described below may take place according to such instructions executed by one or more of the computing devices included in system 100. Computer-executable instructions may be compiled or interpreted from computer programs created using a variety of programming languages and/or technologies known to those skilled in the art, including, without limitation, and either alone or in combination, JAVA, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Figure 2:
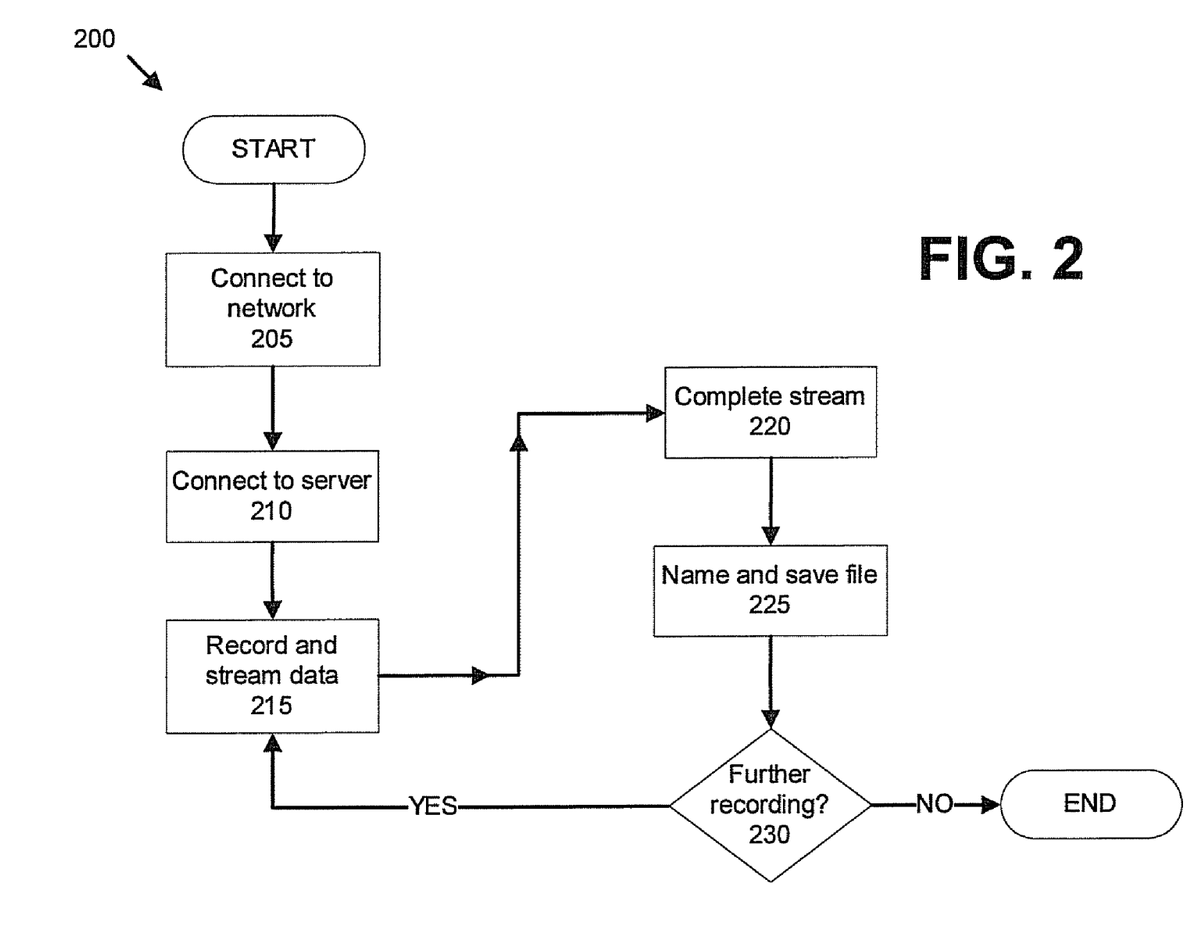
FIG. 2 illustrates an exemplary process for recording digital data and streaming the digital data to a media storage server in real-time or near real time.

FIG. 2 illustrates a process 200 for recording digital data and streaming the digital data to media storage server 125 in real-time or near real time.

In step 205, interface 110, through router 115, connects to network 120. Recording device 105 and/or interface 110 may include a numeric keypad, an alphanumeric keypad, or the like to allow a user to enter a username, a password, or other information necessary to authenticate to network 120. It is also possible that interface 110 may be configured to connect automatically to a network of 120 when powered on.

Next, in step 210, interface 110 establishes a connection to media storage server 125. As mentioned above, network device 130 may operate in a manner similar to media storage server 125, and therefore it is to be understood that step 210 may include establishing a connection to a network device 130. Further, it is possible that, prior to step 210, a user has had to provide input identifying a destination for streamed digital data from recording device 105. That is, a user may be able to select from multiple media storage servers 125 and/or computers 130 as destinations for streamed digital data for recording device 105.

In any event, and authentication module in media storage server 125 may determine whether the connection of step 210 may be established. For example, interface 110 may be configured to provide user-entered login information such as a username, password, account identifier, etc. to media storage server 125, or interface 110 may be configured automatically to connect to media storage server 125. In any event, the authentication module may check such information against a database or the like to determine whether interface 110 may connect to media storage server 125. As mentioned above, communications between interface 110 and media storage server 125 may happen according to a number of protocols for communications in a packet switched network such as network 120.

Next, in step 215, recording device 105 records some phenomenon or phenomena, e.g., still images, moving images, audio, etc., and streams digital data representing the phenomenon or phenomena to interface 110, which in turn streams the digital data to media storage server 125, where the digital data is received by receiving module 140. Such stream of digital data may be in any one of a number of known formats, e.g., MPEG, JPEG, MP3, etc., and may be encrypted. Recording device 105 may simultaneously provide outputs such as video and/or audio outputs, and may also store the digital data on a computer readable medium in, or associated with, recording device 105, such as a computer disk, a flash memory, etc. As mentioned above, interface 110 generally includes a buffer, and therefore recording device 105 generally provides digital data to the buffer in interface 110, and interface 110 in turn retrieves digital data from the buffer for streaming to media storage server 125. Alternatively, a buffer may be included in recording device 105, and data may be provided to interface 110 for streaming to media storage server 125 from this buffer. In any event, upon receiving digital data streamed from interface 110, receiving module 140 stores the data in a temporary file or the like until the data stream is complete.

Next, in step 220, interface 110 completes sending a stream of digital data commenced in step 215. Receiving module 140 may detect that such recording is complete when the stream of digital data is interrupted or ends, or when an end of file condition or character is provided by interface 110 in the digital data stream.

Next, in step 225, receiving module 140 permanently names and persistently saves in data store 135 the temporary file described above with respect to step 215. Interface 110 may provide a user with the ability to specify a name for a file, associate the file with other files, etc. when the file is persistently saved in data store 135. For example, a user may provide such information prior to beginning recording, whereupon such information may be provided to media storage server 125 as part of the digital datastream described above with respect to step 215. However, it is also possible for file identifying and location information to be provided to media storage server 125 separately, e.g., after recording is complete according to user input prompted by interface 110, whereupon such input may be sent to media storage server 125 according to HTTP.

Further, it is also possible that receiving module 140 may automatically assign a name and storage location to a file. For example, receiving module 140 may assign a name to a file according to an identifier for a user account, and may further automatically store the file in association with other files for that user account. Moreover, recording device 105 may provide information that may be used by receiving module 140 to assign file name. For example, along with a stream of digital data, recording device 105 may provide metadata such as a timestamp, a geographic location from which the stream of digital data originated, etc. As is known, recording devices 105 such as cellular telephones, devices equipped with a global positioning system (GPS), etc. may be capable of providing a geographic location. Such metadata information may be used by receiving module 140 to assign a name to a file including streamed digital data.

It is to be understood that files may be stored in media storage server 125 according to virtually any format in which digital data may be stored, including, without limitation, joint photographic experts group (JPEG) standards, graphical interchange format (GIF), tagged image file format (TIFF), portable network graphics (PNG), motion picture experts group (MPEG) standards, QuickTime, MPEG-1 audio layer 3 (MP3), waveform audio format (WAV), RealAudio, etc.

Next, in step 230, if no further recording and streaming of digital data to media storage server 125 takes place, then process 200 ends. Otherwise, process 200 may return to step 215.

Figure 3:
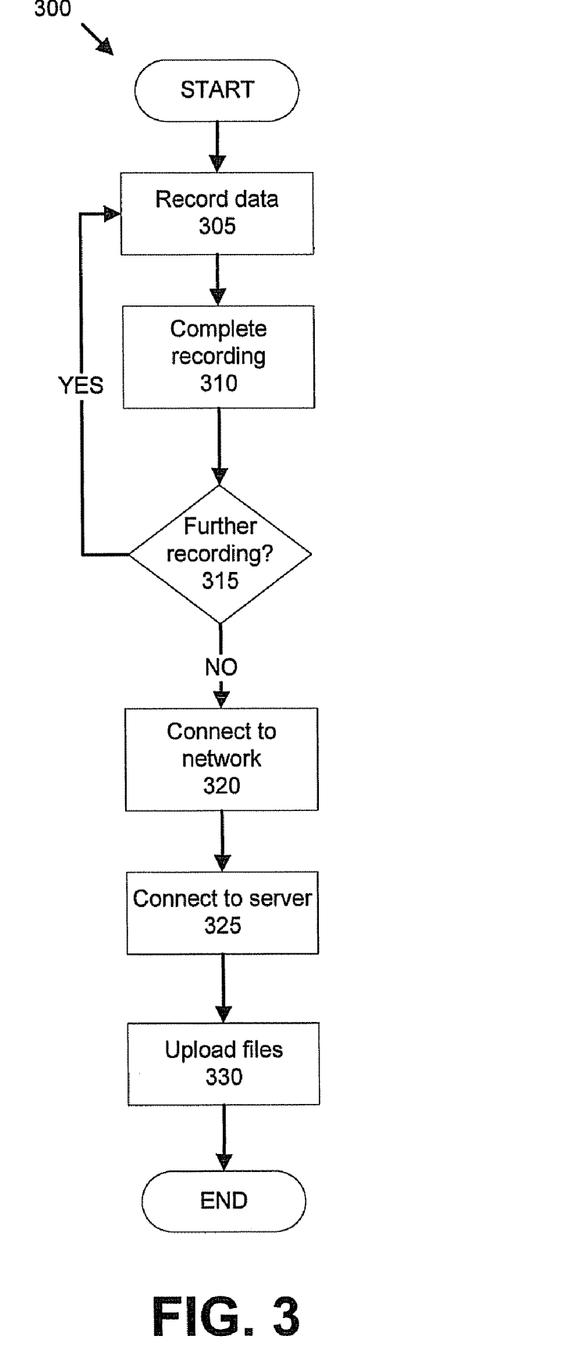
FIG. 3 illustrates an exemplary process for recording digital data and downloading the digital data to a media storage server.

FIG. 3 illustrates an exemplary process 300 for recording digital data and downloading the digital data to media storage server 125.

In step 305, recording device 105 records some phenomenon or phenomena, e.g., still images, moving images, audio, etc., and saves digital data representing the recording to a medium such as a memory card, e.g., a flash memory, in recording device 105.

Next, in step 310, the recording commenced in step 305 is completed. The result of such recording is generally a file saved on medium included in recording device 105 as mentioned above with reference to step 305. Such a file may be automatically named by recording device 105, or be named according to user input provided through a user interface that may be part of recording device 105 or interface 110.

Next, in step 315, a user may decide to make further recordings of digital data. If so, process 300 returns to step 305. Otherwise, step 320 is executed next.

In step 320, interface 110, through router 115, connects to network 120 as described above with respect to step 205 in process 200.

Next, in step 325, interface 110 establishes a connection to media storage server 125 as described above with respect to step 210 in process 200.

Next, in step 330, a file or files saved as described above with respect to step 310 are uploaded to media storage server 125, where they are received by receiving module 140. Such files may be stored in data store 135 in a variety of manners such as is described above with respect to step 225.

Following step 330, process 300 ends.

Figure 4:
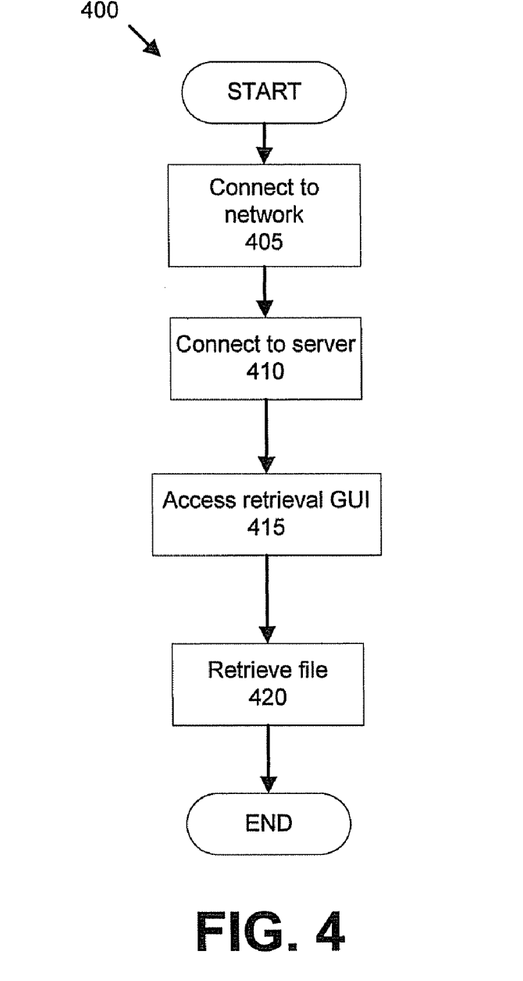
FIG. 4 illustrates a process by which a computer may be used to retrieve a file or files from a media storage server.

FIG. 4 illustrates a process 400 by which network device 130 or content processing device 170 are used to retrieve a file or files from media storage server 125. Further, it is possible that recording device 105 and/or interface 110 may be used to retrieve a file or files from media storage server 125.

In steps 405 and 410, network device 130 or content processing device 170 connects to network 120 and media storage server 125, much as is described above with respect to interface 110 in processes 200 and 300.

Additionally, with respect to step 405, network device 130 or content processing device 170 may be located within customer premises 160, and may connect to network 120 through service provider 155. Therefore, it is to be understood that in this case step 405 generally includes authenticating to service provider 155, which in turn provides a connection to network 120. Further, a user of content processing device 170 may provide login information, e.g., a user name and password, using a remote control device, a keyboard, or other input device in communication with content processing device 170, which in turn may provide such login information to service provider 155 through BHR 165. Additionally or alternatively, content processing device 170 may be programmed to provide the unique or substantially unique identifier associated with content processing device 170.

Moreover, with respect to 410, it should be understood that a user accessing media storage server 125 to retrieve a file or files need not be the same user who accessed media storage server 125 to store such file or files, e.g., as described above with respect to processes 200 and 300. However, the authentication module mentioned above may authenticate both users who stored a file or files on media storage server 125 as well as users seeking to retrieve a file or files from media storage 125, regardless of whether the users seeking to retrieve files are the same users who store the files. For example, a user could be established as a subscriber to a set of files stored on media storage server 125 by one or more other users. Accordingly, when attempting to access files in media storage server 125 through network device 130 or content processing device 170, step 410 may include providing a subscriber identifier or the like, which is authenticated by media storage server 125 to provide a user with access to a specified file or set of files.

Next, in step 415, media storage server 125 provides graphical user interface (GUI) 145, e.g., a web page or the like, for display in network device 130. GUI 145 may provide a user with a list of file names available for retrieval by that user, where such file names may be categorized in various ways. For example, files stored in media storage server 125 may be organized according to file type, e.g., audio, video, still image, etc. Further, files stored in media storage server 125 may be organized in a hierarchical file structure using folders, subfolders, etc. as is known. Within folders and subfolders, users are generally provided with the ability to sort file information according to, for example, file name, date and time when the file was saved, date and time when the file was recorded, etc. A user may navigate through a file structure to locate files of interest, or GUI 145 may provide an interface whereby a user may enter a keyword to request that media storage server 125 conduct a keyword search for files of interest.

Although the present illustration of process 400 shows a request for files in media storage server 125 being made in step 415, following authentication of a user or subscriber by media storage server 125 in step 410, it is possible that a user could view GUI 145, and then be authenticated by media storage server 125. For example, where a user is a subscriber entitled to receive a file or set of files in media storage server 125 provided by another user, such subscriber may be permitted to view a list of available files, and authenticated only when a particular file or set of files is requested. Further, authentication by media storage server 125 is described with respect to step 410 could be replaced by an e-commerce transaction or the like. For example, a user could make a file or set of files available on media storage server 125, e.g., according to one of processes 200 or 300, and a second user could be permitted to access such file or set of files after providing payment information such as is known.

Next, in step 420, streaming module 150 in media storage server 125 provides a requested file or files to network device 130. Such file or files may be provided in a variety of ways. For example, files may be streamed to network device 130 for playback using a software media player such as Windows Media Player, iTunes, RealPlayer, etc. included on network device 130. Further, files may be streamed or downloaded to network device 130 for storage and possible later playback or viewing.

Following step 420, process 400 ends.

Figure 5:
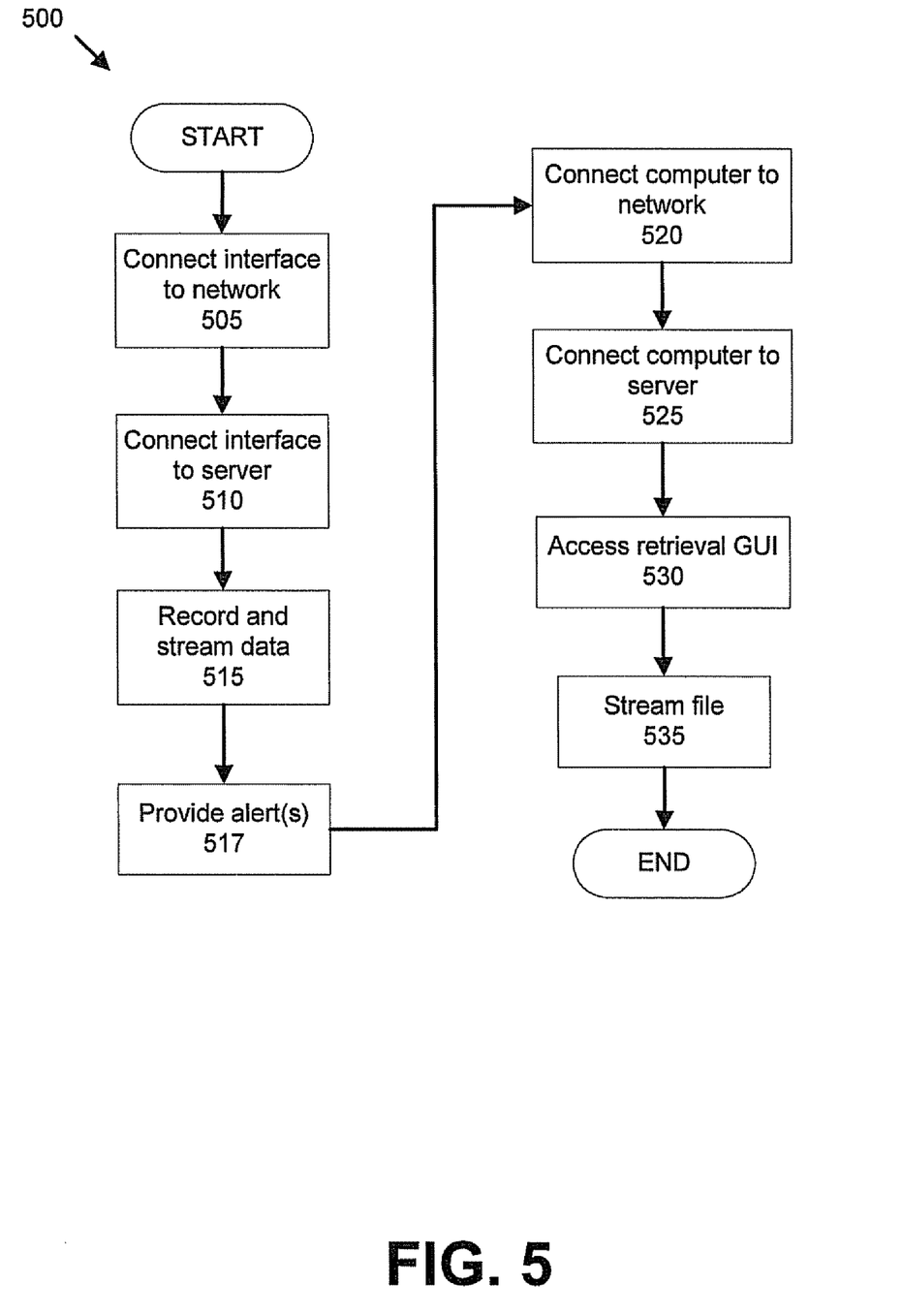
FIG. 5 illustrates a process by which a computer may be used to retrieve a recording made by a recording device from a media storage server in near real time.

FIG. 5 illustrates a process by which network device 130 or content processing device 170 may be used to retrieve a recording made by recording device 105 from media storage server 125 in near real time.

In step 505, as described above with respect to step 205, interface 110, through router 115, connects to network 120.

Next, in step 510, as described above with respect to step 210, interface 110 establishes a connection to media storage server 125.

Next, in step 515, as described above with respect to step 215, recording device 105 records some phenomenon or phenomena, e.g., still images, moving images, audio, etc., and streams digital data representing the phenomenon or phenomena to interface 110, which in turn streams the digital data to receiving module 140 in media storage server 125. Upon receiving digital data streamed from interface 110, receiving module 140 stores the data in a temporary file or the like. In some cases, a temporary file may not be available until the data stream is complete. However, media storage server 125 may provide a data stream to requesting users, e.g., users at network device 130 or content processing device 170, while the data stream is being stored in the file. Accordingly, content recorded by recorder 105 may be streamed to media storage server 125 in real or near-real time, and media storage server 125 in turn may store and at the same time provide recorded content to users who have subscribed to it, e.g., at network device 130 or content processing device 170.

Accordingly, next, in step 517, media storage server 125 may send messages or alerts to users, e.g. to network device 130, content processing device 170, etc. informing the user that subscribed-for content is available on a real-time or near real-time basis. Thus, recording device 105 may be used to provide content on a real-time or near real-time basis to remote users. For example, parents on vacation with their children could provide video or images of the children to relatives on a real-time or near real-time basis. Users could also receive alerts concerning content available to them on a pay-per-view basis, or content which they have subscribed to receive. Ways in which an alert in step 517 could be triggered may include a user providing input through interface 110, e.g., by providing input through recording device 105. Further, program instructions in media storage server 125 may provide for sending an alert to one or more pre-specified destinations when content is received as described above with respect to step 515.

Next, in step 520 and 525, network device 130 or content processing device 170 connects to network 120 and media storage server 125 much as is described above with respect to steps 205 or 405.

Next, in step 530, media storage server 125 provides graphical user interface GUI 145, e.g., a web page or the like, for display in network device 130 or any devices such as media player 175 attached to content processing device 170, much is as described above with respect to step 415 in process 400. However, in addition to any other list of file names available for retrieval by a user, and GUI 145 provided in step 530 includes one or more files that are in the process of being streamed from a recording device 105 and that are presently stored in a temporary file and media storage server 125, as described above with respect to process 200. Such files may be referred to as "near real-time files." As described above with respect to step 430, it is also possible with respect to process 500 that a user could view GUI 145, and then be authenticated by media storage server 125, e.g., as a subscriber for near real-time files. It is also possible that, instead of being authenticated as described with respect to step 510 a user could purchase near real-time files, e.g., in an e-commerce transaction.

Next, in step 535, upon a user's selection of a real-time or near real-time file, in the near real-time file is streamed to network device 130 by streaming module 150 where it may be played in media playback software such as that mentioned above. The streaming of a near real-time file may end upon user's termination of the stream, e.g., by providing input to media playback software to terminate the stream, or by the end of the near real-time file being reached.

Following step 535, process 500 ends.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
    a media storage server, comprising:
        an authentication module that selectively receives user identification information from a recording device via a network and determines whether the recording device is authorized to transmit digital data to the media storage server;
        a receiving module that selectively receives a stream of digital data from the recording device via the network;
        a data store that selectively stores the digital data; and
        a streaming module that selectively streams the stored digital data to a network device via the network while the receiving module receives the stream of digital data from the recording device and before completion of the stream of digital data from the recording device,
    wherein the media storage server is configured to provide a graphical user interface to the network device via the network,
    wherein the graphical user interface includes a listing of available digital data, and
    wherein the listing of digital data identifies the stream of digital data while the stream of digital data is being received at the media storage server and before the stream of digital data is completely received at the media storage server.

2. The system of claim 1, wherein the receiving module is configured to store the stream of digital data in a temporary file while the stream of digital data is being received at the media storage server and before the stream of digital data is completely received at the media storage server, and
    wherein the streaming module is configured to stream the stream of digital data to the network device from the temporary file.

3. The system of claim 2, wherein the network device is one of a set-top box or a computer.

4. The system of claim 3, wherein the media storage server is further configured to:
    receive a request for streaming of the data stream from the network device subsequent to presentation of the listing of available digital data; and
    authenticate, by the authentication module, a user of the network device based on the request to determine whether the user of the network device is authorized to receive the data stream.

5. The system of claim 1, wherein the streaming module is configured to transmit an alert to the network device via the network based on user input received from the recording device, wherein the alert is transmitted concurrently with the receipt of the stream of digital data from the recording device.

6. The system of claim 1, wherein the media storage server further comprises a network interface that selectively receives the stream of digital data from the recording device and that selectively provides the stream of digital data to the receiving module.

7. The system of claim 1, wherein the digital data includes at least one of audio, video, or a still image.

8. The system of claim 1, wherein the network includes evolution-data optimized code division multiple access.

9. The system of claim 1, wherein the digital data is streamed to the network device from a data store associated with the stream of digital data from the recording device.

10. A method, comprising:
receiving, at a media storage server via a network, a request for authentication from a recording device;
authenticating the recording device at the media storage server;
receiving, at the media storage server, a stream of digital data from a buffer associated with the recording device while a phenomenon represented by the digital data is being recorded by the recording device upon authentication of the recording device;
storing the stream of digital data in a data store using a file name based on metadata provided by the recording device, wherein the metadata comprises one of timestamp information or geographic location information;
listing the stream of digital data in a user interface accessible to a network device over the network, wherein the listing identifies the stream of digital data while the steam of digital data is being received at the media storage server;
receiving, at the media storage server, a request for the stream of digital data identified in the listing from the network device via the network;
authenticating a user of the network device, based on the request, to determine whether the user of the network device is authorized to receive the stream of digital data identified in the listing; and
streaming the digital data to the network device from the data store while the media storage server receives the stream of digital data from the buffer associated with the recording device and before completion of the stream of digital data from the recording device.

11. The method of claim 10, wherein the listing includes the filename based on the received metadata.

12. The method of claim 11, wherein the network device is one of a set-top box or a computer.

13. The method of claim 12, wherein the set-top box is connected to the network through a wireless connection.

14. The method of claim 10, further comprising receiving user identification information and determining whether the stream of digital data is authorized to be provided according to the user identification information.

15. The method of claim 10, further comprising:
determining whether the network device is subscribed to content associated with the stream of digital data; and
transmitting an alert to the network device when the network device is subscribed to content associated with the stream of digital data.

16. The method of claim 10, wherein the network includes evolution-data optimized code division multiple access.

17. The method of claim 10, further comprising:
receiving a second stream of digital data from the recording device; and
storing the second stream as a second stream of digital data.

18. The method of claim 17, further comprising:
listing the stream of digital data and the second stream of digital data in a user interface accessible to a network device over the network; and
streaming at least one of the stream of digital data and the second stream of digital data to the network device via the network.

19. The method of claim 10, wherein the stream of digital data is received from a recording device buffer.

20. The method of claim 10, tangibly embodied as computer-executable instructions on a computer-readable memory device.

21. A system, comprising:
a recording device that selectively provides a stream of digital data;
an authentication module that selectively receives user identification information from the recording device via a network and determines whether the recording device is authorized to transmit the stream of digital data;
a receiving module that selectively receives a stream of digital data when the recording device is authorized to transmit the stream of digital data;
a network interface that selectively receives the stream of digital data from the recording device and that selectively provides the stream of digital data to the receiving module via a network;
a data store that temporarily stores the digital data;
a streaming module that transmits an alert to a network device via the network based on user input received from the recording device,
wherein the alert is transmitted in real time relative to receiving the stream of digital data from the recording device,
wherein the streaming module selectively streams the digital data from the data store to a network device via the network upon request by the network device following receipt of the alert,
wherein the streaming module streams the stored digital data to the network device from the data store while the receiving module receives the stream of digital data from the recording device and before completion of the stream of digital data from the recording device; and
a user interface that is selectively displayed on the network device and that displays a listing of available digital data, wherein the listing of available digital data includes an identification of the stream of digital data temporarily stored in the data store.

22. The system of claim 21, wherein the user interface is used to provide a selection of digital data for download to the network device.

* * * * *